Figure 1:
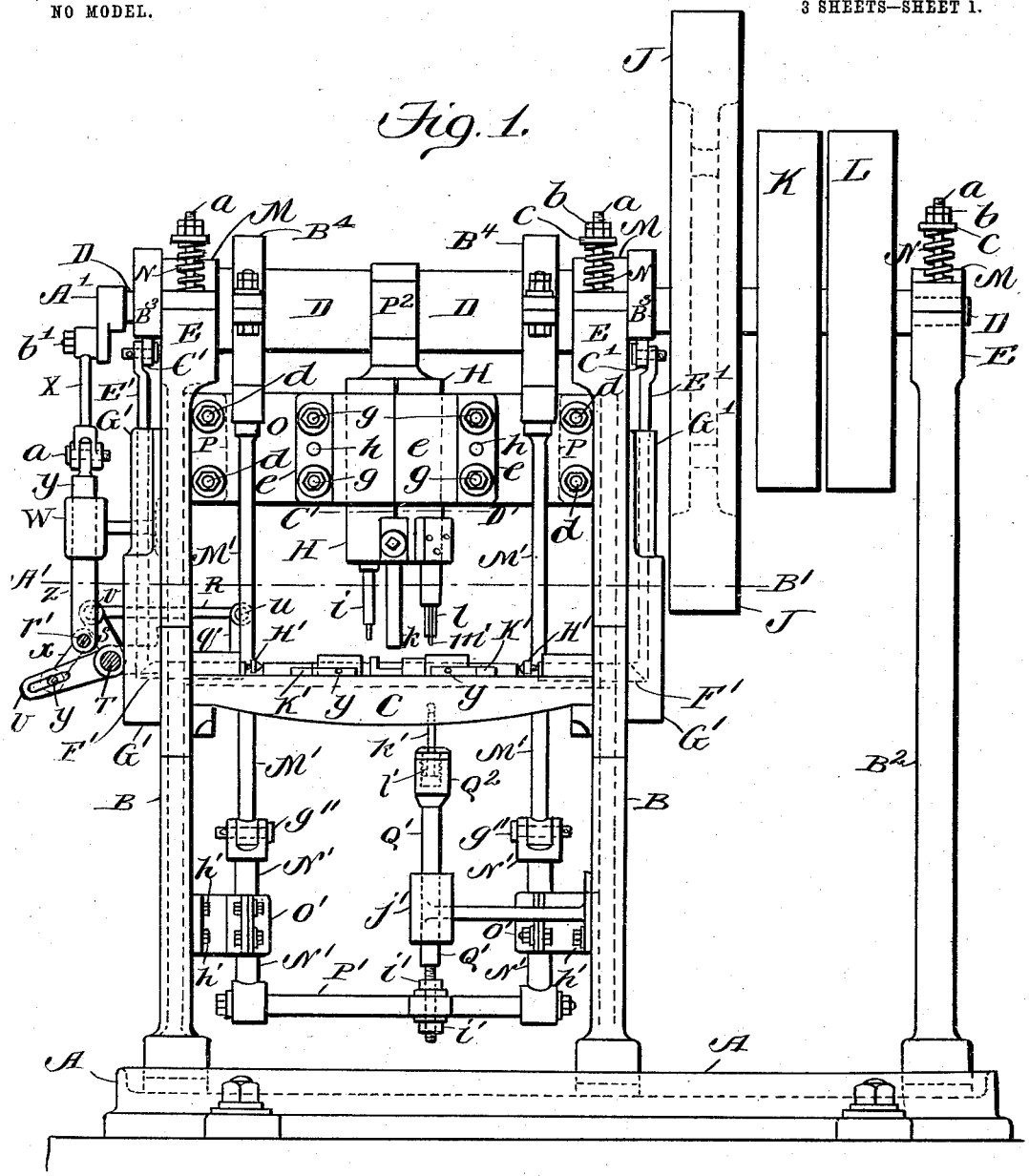

No. 743,266. PATENTED NOV. 3, 1903.
T. H. FORD & R. WALMSLEY.
MACHINE FOR STAMPING NUTS OR OTHER SMALL ARTICLES.
APPLICATION FILED DEC. 22, 1902.
NO MODEL. 3 SHEETS—SHEET 1.

Witnesses
C. L. Kesler
James L. Norris, Jr.

Inventors
Thomas H. Ford
Richard Walmsley
By James L. Norris
Atty

No. 743,266. PATENTED NOV. 3, 1903.
T. H. FORD & R. WALMSLEY.
MACHINE FOR STAMPING NUTS OR OTHER SMALL ARTICLES.
APPLICATION FILED DEC. 22, 1902.
NO MODEL. 3 SHEETS—SHEET 2.
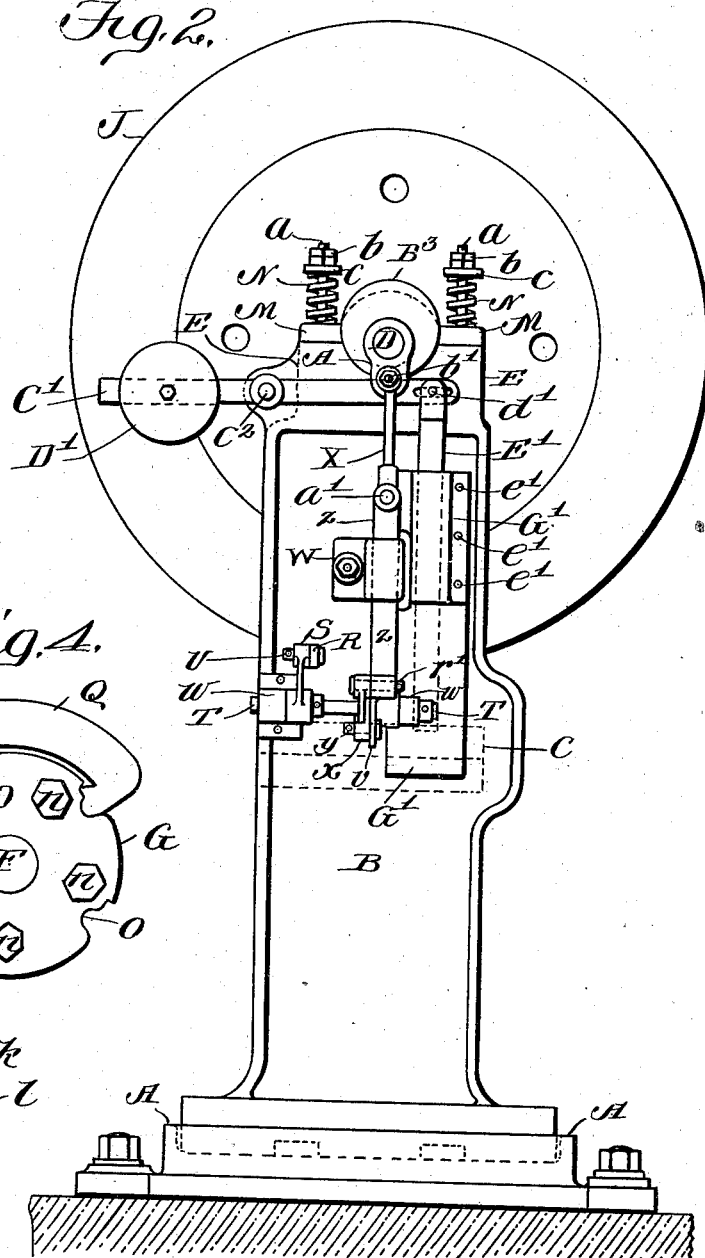

No. 743,266. PATENTED NOV. 3, 1903.
T. H. FORD & R. WALMSLEY.
MACHINE FOR STAMPING NUTS OR OTHER SMALL ARTICLES.
APPLICATION FILED DEC. 22, 1902.
NO MODEL. 3 SHEETS—SHEET 3.
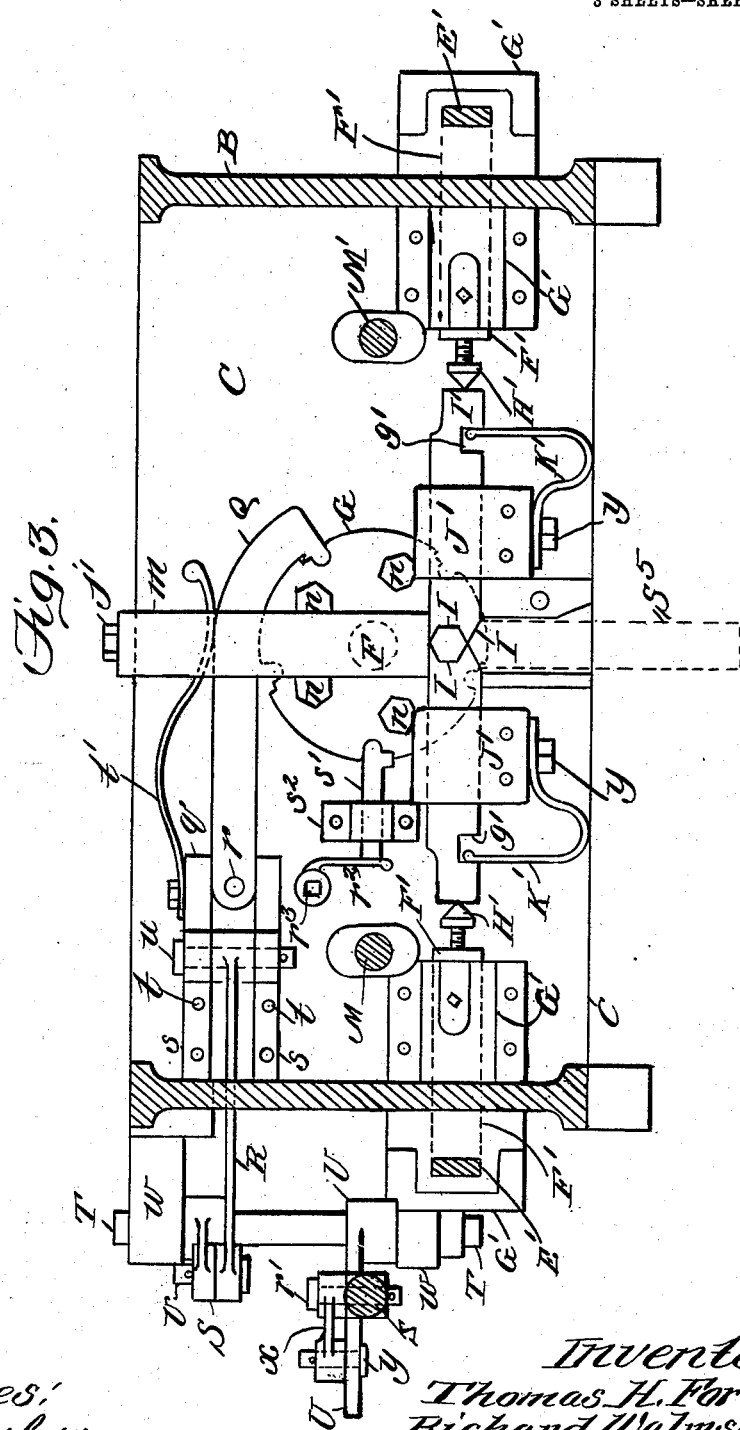
Witnesses:
Inventors
Thomas H. Ford
Richard Walmsley
By James L. Norris
Atty.

No. 743,266. Patented November 3, 1903.

UNITED STATES PATENT OFFICE.

THOMAS HENRY FORD, OF FARNWORTH, NEAR BOLTON, AND RICHARD WALMSLEY, OF BOLTON, ENGLAND.

MACHINE FOR STAMPING NUTS OR OTHER SMALL ARTICLES.

SPECIFICATION forming part of Letters Patent No. 743,266, dated November 3, 1903.

Application filed December 22, 1902. Serial No. 136,235. (No model.)

*To all whom it may concern:*

Be it known that we, THOMAS HENRY FORD, nut and bolt manufacturer, residing at 55 Rawson street, Farnworth, near Bolton, and RICHARD WALMSLEY, iron manufacturer, residing at Atlas Forge, Bolton, in the county of Lancaster, England, both citizens of England, have invented certain new and useful Improvements in Machines for Stamping Nuts or other Small Articles, of which the following is a specification.

This invention refers to improvements in machines for stamping nuts or other small articles—such as washers, bicycle-stampings, chains, and similar articles—and includes a suitable shaft or center located in bearings with yielding and adjustable spring-caps secured in any convenient manner to the machine. On one end of a shaft or center is mounted a rotating die, which is interchangeable for varying sizes of nuts, stampings, and the like. The aforesaid die is rotated, say, one-fifth of the circumference or otherwise, as desired, at a time. On the upper end of the machine is located in yielding or other bearings an eccentric-shaft which operates slides in either direction, carrying tools for punching and forming the nut. In the second operation—i. e., when the nut is roughly formed by the ordinary V's—the said rotary die revolves one-fifth or otherwise, as desired. The said tool forms one-half the depth of the nut by means of a specially-formed end, by which a perfect nut is left within the grip of the die, and in the next movement of the said tool another "punch" contained in the same slide or bearing punches out the remaining "bur," and on the further movement of the same the slide works down and forces the nut away. The tool which forms and "snaps" the nut is provided on its end with a projection which half forms the hole of the stamped nut, by which hollowness of the nut or other punched article is prevented.

In the drawings, Figure 1 is a front elevation of our invention for improvements in or relating to stamping-nuts and other small articles; Fig. 2, an end elevation looking on left-hand side of Fig. 1; Fig. 3, a part plan through line A' B' in Fig. 1; Fig. 4, an enlarged plan of rotating die which is interchangeable for varying sizes of nuts, stampings, and the like; and Fig. 5, a sectional plan through line C' D' in Fig. 1.

A is the foundation or bed-plate; B and $B^2$, standards; C, cross-stay or table; D, crank or eccentric shaft; E, yielding bearings; F, shaft or center carrying rotating die; G, rotating die; H, slide carrying the punching and stamping tools; I, the V's; J, fly-wheel; K, fast driving-pulley, and L loose pulley.

In all the figures the same letters are employed to indicate corresponding parts.

On the foundation or bed plate A are fixed the standards B and $B^2$, provided on their upper ends with the yielding bearings E, in which is mounted the crank or eccentric shaft D. The bearings E are provided with the caps M, which are held in position by the bolts $a$, nuts $b$, washers $c$, and the spiral springs N, the latter allowing the crank or eccentric shaft D to rise or yield in case of any obstruction taking place in the vertical movements effected by the rotating action of the same, thereby minimizing breakages and strain to an infinitesimal quantity. The standards B are connected together at their upper ends and immediately below the yielding bearings E by the cross bar or stay O, secured to the projections P on the standards B by the bolts $d$. In the cross bar or stay O is mounted the slide H, the upper end being provided with the split ring $P^2$, in which operates the pin or center of the crank or eccentric shaft D, which operates up and down the slide H, carrying the tools $i$, $k$, and $l$ for punching and forming the nut. The slide H is held in its vertical working position in the cross-bar O by the cap $e$, secured by the bolts $g$ and the "steadying-pins" $h$. In and on the cross-stay or table C is mounted the shaft or center F, carrying the rotating die G, being held down in its position by the bar or stay $m$, secured to the side of the cross-stay or table C by the set-screw $j'$. The rotating die G is provided with the indents $n$ on its face and the notches $o$ on its outer periphery, the notches $o$ being provided for the purpose of intermittently rotating the said die G by the sliding or reciprocating action of the "pawl-lever" Q, pivoted by the pin $r$ to the slide $q$, mounted in the slide-bar s, secured by the set-screws t to the cross-stay or table C. The pawl-lever Q is held in contact with the rotating die G by means of the spring t', secured to the slide q, by which the correct operations of the pawl-lever Q are insured. To prevent any "rebound" in the rotary action of the rotating die G and insure of its correct working position being effected, it is arrested in its motion by the sliding bar s', mounted in the fixing $s^2$, secured to the cross-stay or table C, the end of the sliding bar s' being forced against the rotating die G by the spring $r^2$, mounted on the fixed center $r^3$. To the slide q is pivoted by the pin u the rod R, the outer end of which is coupled to the lever S by the pin v. The lever S is mounted on the shaft T, located in the suitably-mounted bearings w. On the shaft T is located the slotted lever U, to which is connected the link x by the pin or center y, the other end of the link x being pivoted to the bottom end of the sliding rod z by the pin or center r', located in the fixing W, secured to the standard B. To the upper end of the sliding rod z is coupled the connecting-rod X by the pin or center a', the other end of the connecting-rod X being coupled to the crank-pin b', secured to the crank A', mounted on the end of the crank or eccentric shaft D. On the latter shaft are located the eccentrics $B^3$, which operate the balanced levers C', pivoted to the standards B by the pins or centers $c^2$, the said levers C' being held against the rotating face or edge of the eccentrics $B^3$ by the balance-weights D'. To the opposite end of the balanced levers C' is connected by the pins or centers d' the sliding bars E', mounted in the slide-bars G', located on each end of the machine, the said slide-bars G' being secured to the standards B by the bolts e'. The lower end of each sliding bar E' is provided with the tapered projection, which operates in conjunction with the slides F'', mounted in the fixings G', located on the cross-stay or table C. The projecting ends of the slides F' are provided with the adjustable screwed centers H', which operate against the ends of the slides I', held in position on the cross-stay or table C by the fixings J', the other end of each slide I' being provided with the V's I, according to the size and form of nut to be stamped. The backward action of each slide I' is effected by the spring K' operating in the slots g', as shown in Fig. 3, the said springs K' being attached to the aforesaid fixings J' by the set-screws y. On the crank or eccentric shaft D are located the eccentrics $B^4$, fitted with the eccentric-rods M', connected at their lower ends by the pins g'' to the slides N', mounted in the fixings or bearings O', secured to the standards B by the set-screws h'. In the bottom end of each slide N' is mounted the cross-bar P', in which is secured the upright sliding rod Q' by means of the nuts i', the said upright sliding rod Q' being mounted in the fixing j', secured to the standard B by set-screws or bolts. The upper end of the upright sliding rod Q' is provided with the box end $Q^2$, in which is secured the punch k' by the bush l', screwed therein. The upper end of the punch k' operates in conjunction with the "pap" or projection m' on the lower end of the tool l, employed for punching and forming the nut. The tool k pushes the "blank" cut off by the V's I into the die. l compresses and half-holes the nut, and the bottom punch k, working from the under side, at the same time punches out the remainder of the hole, leaving a thin film of iron between itself and the "snap" m' on the tool l. (Shown in Fig. 1.) The nut having arrived opposite the punch k by the rotating action of the die G in a finished state outwardly, but with the thin film remaining in the hole, the punch i cleans out entirely the said film and leaves the nut under treatment perfect. The bottom end of the punch i is tapered and acts as a steadier to the rotating die G and at the same time knocks or forces the finished nut out of the machine, which may be carried therefrom by a "chute" to deliver the finished nut in any desired or required receptacle.

The operation of the hereinbefore-described machine is as follows: The attendant places the heated bar or stock $S^5$, from which the nuts are to be stamped, between the V's I when the latter are apart, and by the movements of the latter toward each other a blank nut is formed in shape outwardly and cut off the said heated bar or stock $S^5$. Immediately the said blank nut is cut off the heated bar or stock $S^5$ the tool or presser K descends with the slide H, operated by the pin or center of the crank or eccentric shaft D, located in the end $P^2$ on the upper end of the said slide H, and presses or forces the cut off blank into the indent n immediately below the same in the rotating die G. Then the V's I are released by the upward movements of the vertical sliding bars E', which action allows the springs K' to force the V's I from each other in a backward direction ready to advance for the next blank nut to be cut off the heated bar or stock $S^5$. Immediately the V's I have been opened or drawn from each other and the blank nut has been forced into the notch n in the rotating die G the latter is rotated one-fifth of a revolution by the pawl-lever Q, pivoted to the slide q, which is operated by the rod R, connected to the lever S, mounted on the shaft T, actuated or oscillated by the lever U, link x, sliding rod y, connecting-rod X, coupled to the crank-pin b', secured to the crank A', mounted on the end of the crank or eccentric shaft D. When the rotating die G has been rotated one-fifth of a revolution, the blank nut in the notch n is partly punched on both sides by the pap or projection m', the downward action of the pap or projection m' and the upward action of the punch or tool k' operating in line vertically and in conjunction with the aforesaid pap $m'$ on the tool $l$, secured to the under side of the slide H. The punch or tool $k'$ is actuated up and down by means of the upright $Q'$, secured to the cross-bar $P'$, attached to the slides $N'$, operated by the eccentric-rods $M'$ and the eccentrics $B^4$ on the crank or eccentric shaft D. The rotating die G is again rotated one-fifth of a revolution, as before described, and when the partly-punched nut or blank arrives opposite the tool $i$, attached to the under side of the slide H, the tool $i$ descends and punches out the thin film left in the partly-punched blank by the pap or projection $m'$ and the punch $k'$ and forces the completed nut (untapped or unthreaded) out of the notch $n$, from whence it falls away from the machine.

Having now particularly described and ascertained the nature of our said invention and in what manner the same is to be performed, we declare that what we claim is—

In a machine of the class described, a power-shaft, a vertically-reciprocative tool-carrying slide operable by said power-shaft, horizontally-reciprocative slides having cutting means coöperative with the tools, springs for operating said horizontally-reciprocative slides in one direction, means operable from the shaft for operating said last-mentioned slides in opposition to the springs, a peripherally-notched die coöperative with the slides, a pawl the working end of which is adapted to enter the notches in the die, a spring holding the pawl to its working position, a horizontally-reciprocative slide to which the pawl is connected, a shaft having two arms one of which is operatively connected to said last-mentioned slide, the other being connected eccentrically with said power-shaft, a punch located in coöperative relation with the tools, and a vertically-reciprocative slide operable by the power-shaft and to which said punch is connected.

In testimony whereof we have hereunto set our hands in presence of two subscribing witnesses.

THOMAS HENRY FORD.
RICHARD WALMSLEY.

Witnesses:
EDMUND CHADWICK.
JAS. STEWART BROADFOOT.